Nov. 20, 1951 W. D. DAIN 2,575,798
CUTTING AND SPLICING APPARATUS
Filed July 25, 1950 2 SHEETS—SHEET 1
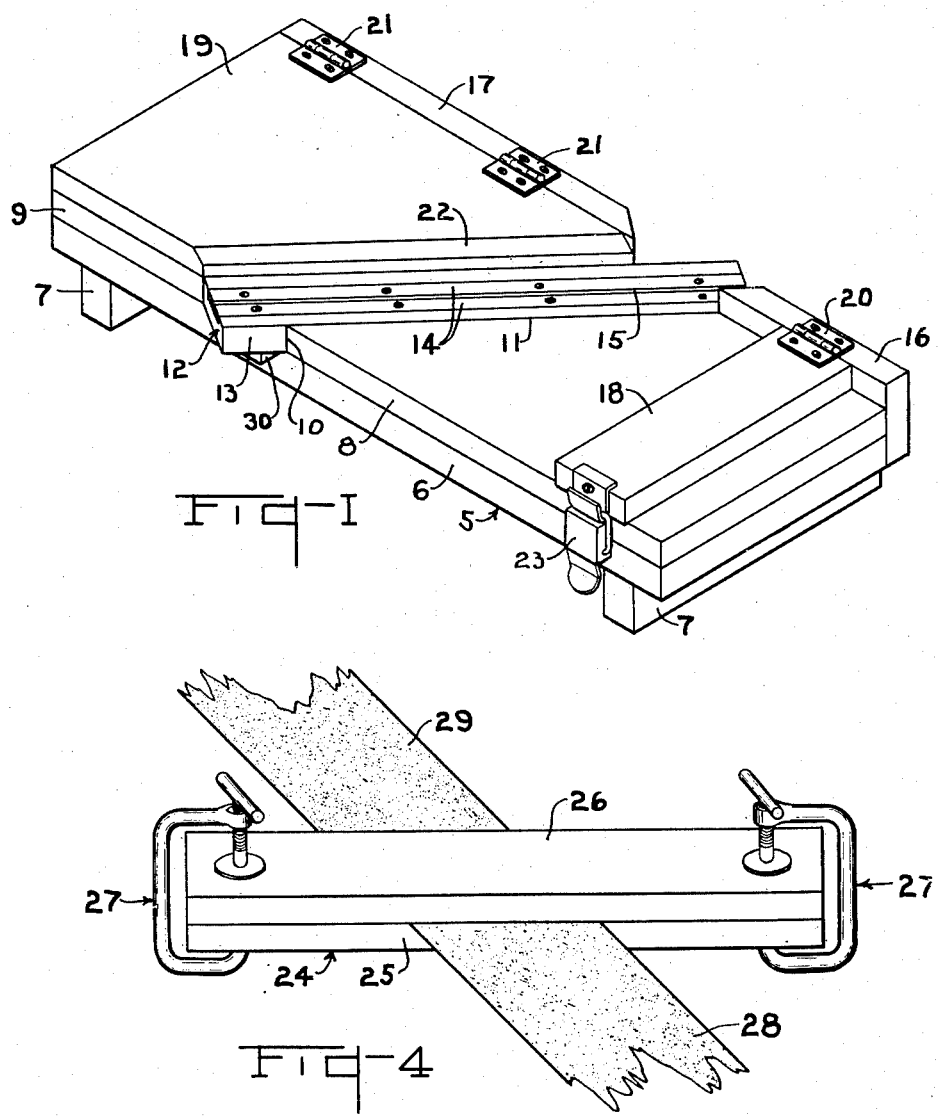
INVENTOR
William D. Dain
BY Roy A. Plant
ATTORNEY Nov. 20, 1951 W. D. DAIN 2,575,798
CUTTING AND SPLICING APPARATUS
Filed July 25, 1950 2 SHEETS—SHEET 2
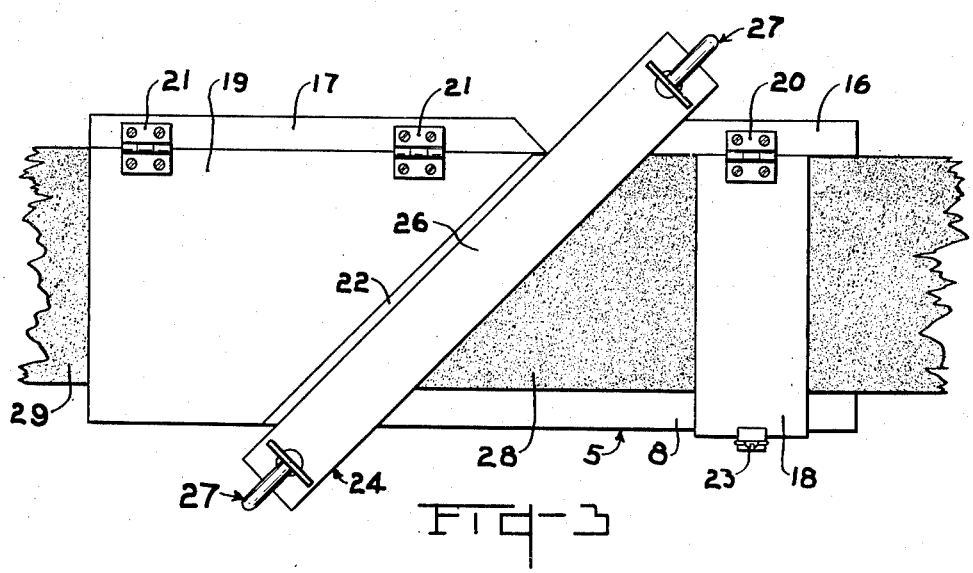
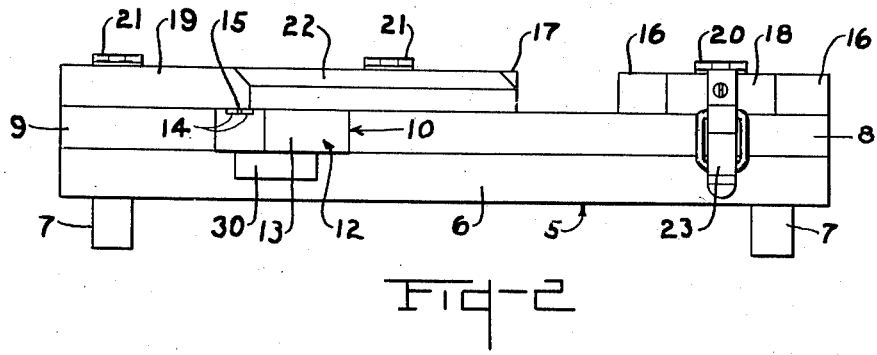
INVENTOR
William D. Dain
BY Roy A. Plant
ATTORNEY Patented Nov. 20, 1951

2,575,798

UNITED STATES PATENT OFFICE 2,575,798

CUTTING AND SPLICING APPARATUS

William D. Dain, Bellevue, Mich.

Application July 25, 1950, Serial No. 175,785

9 Claims. (Cl. 154—42)

This invention relates broadly to devices used in splicing belts, and is designed primarily for splicing sanding belts such as those used in furniture factories, woodworking mills, and the like. Such belting is supplied in rolls from which any required length is cut, after which the cut ends are skived and cemented together to provide a continuous belt for a sanding machine.

Most continuous sanding belts are factory made and sold to the woodworking firms using them, although sanding belt stock can be purchased in rolls and spliced by the user. Where that type of splicing is done, it is rather crude and inaccurate due to the equipment which has to be used in view of the lack of any belt cutting and splicing apparatus on the market. It was a recognition of this situation and the need of a simple, accurate, efficient, and low cost belt cutting and splicing apparatus which lead to the conception and development of the present invention.

Accordingly among the objects of the present invention is the provision of an easily operable device which will facilitate rapid yet accurate cutting of the ends of the belting at the same angle, and rapid as well as accurate cementing and clamping of the cut ends after skiving.

Another object is to provide a device of the character above mentioned in which a base upon which the end portions of the belt are clamped during cutting and cementing, is provided with dual-function means for (1) removably holding a guide for the belt-cutting knife and (2) removably holding the base section of a clamp which is used for securing the cemented belt ends together while the cement sets up.

A further object is to provide for positioning the aforesaid base section of the belt-end-clamp in such relation with the main base of the device that the two bases will jointly form a horizontal support for the belt ends during the cementing operation.

A further object is to provide a device which permits the belt and the clamp for its cemented ends to be bodily removed, whereby the knife guide may be repositioned and another belt may be cut and spliced while the cement of the first belt is setting up.

A further object is to provide a simple and inexpensive construction, yet one which will effectively perform the functions for which it is intended.

Still further objects and advantages of the present invention will appear as the description proceeds.

To the accomplishment of the foregoing and related ends, the invention, then consists of the cutting and splicing apparatus hereinafter fully described and particularly pointed out in the claims, the annexed drawings and the following description setting forth in detail certain means for carrying out the invention, such disclosed means illustrating, however, but one of various ways in which the principle of the invention may be used.

In the annexed drawings—

Figure 1 is a perspective view of the cutting and splicing apparatus with the knife guide in position for use.

Figure 2 is a front edge view of the apparatus with the knife guide in place, as in Figure 1.

Figure 3 is a top plan view of the apparatus showing the spliced belt and its clamp in readiness for removal.

Figure 4 is a perspective view of a portion of the spliced belt and the belt end clamp removed for setting up of the cement.

A preferred construction of the belt cutting and splicing apparatus has been shown in the drawings above briefly described, and while the construction involved will now be rather specifically described, it is to be understood that variations may be made within the scope of the claimed invention.

A base 5 is shown which may well be of wooden construction, said base comprising a lower horizontal board 6 secured upon transverse cleats 7, and two upper horizontal boards 8 and 9 secured upon said lower board 6, said boards 8 and 9 being of substantially the same thickness. The longitudinal side edges and the outer end edges of the boards 8 and 9 may well be flush with the corresponding edges of the board 6 but the inner edges of said boards 8 and 9 are spaced apart, are cut diagonally, and are disposed in spaced relation to provide the base 5 with a transverse, upwardly open diagonal groove 10. The diagonal inner end of the board 8 is shown at 11 in Figure 1, and the corresponding edge of the board 9 is substantially parallel with said edge 11.

A knife guide 12 is removably receivable in the groove 10 and preferably consists of a wooden block 13 with two metal strips 14 inset in the top of said block, and a stop member 30 on each end of the bottom of said block to hold same against endwise movement during belt cutting. This block is of substantially the same thickness as the boards 8 and 9, and the strips 14 are spaced apart to provide a knife-guiding groove 15.

At opposite sides of the groove 10, the rear edge of the base 5 is provided with upwardly projecting longitudinally alined back stops 16 and 17 which may well be formed by securing strips of wood to said base. Two belt-clamping members 18 and 19 are hinged at 20 and 21 to the back stops 16 and 17 respectively, to swing to and from clamping relation with the boards 8 and 9, respectively. The member 18 is longitudinally spaced from the groove 10 and may simply be an elongated strip of wood, but the member 19 is preferably of more extensive area. This member 19 is preferably a wooden board having a beveled inner edge 22 unidirectional with and located adjacent the groove 10. Suitable releasable means 23 is provided for holding the member 18 in clamping position, but the member 19 is preferably held down by hand, as will be later explained.

A clamp 24 is provided to hold the belt ends together while the splicing cement sets up, said clamp 24 preferably consisting of a base section 25 and an upper section 26 both formed from wood, and C-clamps 27 for clamping the ends of said sections 25 and 26 together. The base section 25 is of a width and thickness to fill the groove 10 when the knife guide 12 is removed from said groove and said base section inserted into the latter for a purpose to appear.

In using the device, the two clamping members 18 and 19 are turned back out of the way and one end of the belting is placed upon the base 5 over the knife-guide 12 and against the back stop 17, the sand surface of the belting being preferably down. The member 19 is then lowered upon the belting and held down with one hand while a knife is used with the other hand to obliquely cut the belting, the knife being guided by the groove 15. The member 19 is then again turned back, the required length of belting is unrolled and measured, and this length is cut off with the knife while the belting is again held against the base and the back stop by means of the member 19. The belt ends are then skived to remove the abrasive material from the area to be cemented, thus placing them in readiness for cementing together. To perform the cementing operation, the knife guide 12 is removed from the groove 10 and the base section 25 of the clamp 24 is laid in said groove. One end portion 28 of the belt, face up, is then laid upon the board 8 and member 25, with its skived end disposed centrally of said member 25 and with one of its side edges against the back stop 16. The member 18 is then lowered and fastened with fastening means 23 to hold this end portion of the belt. Then, by means of the member 19, the other end portion 29 of the belt is held in proper position on the board 9 against the back stop 17 and the two skived ends are cemented together. The upper section 26 of clamp 24 is then secured in place upon the cemented ends, by means of the C-clamps 27, and both the cemented belt and the clamp 24 may then be unitarily removed and carried to a place where they may be left intact while the cement is setting up. The knife guide 12 may then be re-inserted in the groove 10 to prepare the device for making up another belt, and any number of belts may be formed while the cement of others is setting up, if one of the clamps 24 be provided for each belt.

From the foregoing, it will be obvious that novel and effective provision has been made for attaining the desired ends, and while preferences have been disclosed attention is again invited to the possibility of making variations within the scope of the invention, such variations of course including changes in the materials from which the elements are constructed as well as changes in the construction of said elements.

Other modes of applying the principle of my invention may be employed instead of the one explained, change being made as regards the apparatus herein disclosed, provided the means stated by any of the following claims or the equivalent of such stated means be employed.

I therefore particularly point out and distinctly claim as my invention:

1. A belt splicing device comprising a base, an upwardly projecting backstop means extending in line along the rear portion of said base for lining up the side edges of the ends of said belt during the splicing of same, two belt clamping members spaced apart longitudinally of said base, and means mounting said clamping members for movement into and out of belt-clamping relation with said base, said base having means for positioning either a knife guide or a belt end clamp between said two clamping members.

2. A belt splicing device comprising a base, an upwardly projecting backstop means extending in line along the rear portion of said base for lining up the side edges of the ends of said belt during the splicing of same, two belt clamping members spaced apart longitudinally of said base, and means mounting said clamping members on said backstop means for movement into and out of belt-clamping relation with said base, said base having means between said two clamping members for removably connecting either a knife guide or a belt end clamp with said base.

3. A belt splicing device comprising a base, an upwardly projecting backstop means extending in line along the rear portion of said base for lining up the side edges of the ends of said belt during the splicing of same, two belt clamping members spaced apart longitudinally of said base, and means mounting said clamping members for movement into and out of belt-clamping relation with said base, said base having a transverse diagonal groove between said two clamping members, said groove opening through the upper side of said base to receive either a knife guide or a belt end clamp.

4. A belt splicing device comprising a base, two belt clamping members spaced apart longitudinally of said base, means mounting said clamping members for movement into and out of belt-clamping relation with said base, said base having a transverse groove located between said two clamping members, said groove opening through the upper side of said base, and a knife guide removably seated in said groove to underlie a piece of belting when the latter is held upon said base.

5. In a structure as specified in claim 4, wherein said groove extends diagonally of said base, and one of said two clamping members has an edge unidirectional with and located adjacent said groove.

6. A belt splicing device comprising a base and means for clamping a belt thereon, said base having a transverse groove, said groove opening through the upper side of said base, a belt end clamping member removably seated in said groove and having its upper side substantially flush with said upper side of said base, whereby the ends of a belt held on said base may be cemented together upon said belt end clamping member; an additional belt end clamping member to lie upon the cemented belt ends, and means for connecting the two belt end clamping members with each other to clamp the cemented belt ends, whereby the cemented belt and said belt end clamping members may be unitarily removed from said base.

7. A belt splicing device comprising a belt supporting base having a transverse diagonal groove between its ends, the rear longitudinal edge of said base being provided with upwardly projecting back stops at opposite sides of said groove, two belt clamping members at opposite sides of said groove and hinged to said back stops to swing downwardly toward said base and upwardly and rearwardly therefrom, one of said clamping members having a diagonal edge unidirectional with and adjacent said groove, the other of said clamping members being relatively long and narrow and being spaced longitudinally of the base from said groove, and means for holding at least one of said clamping members in lowered position, said groove being adapted to receive either a knife guide or a belt end clamp.

8. A belt splicing device comprising a belt supporting base having a transverse diagonal groove between its ends, the rear longitudinal edge of said base being provided with upwardly projecting back stops at opposite sides of said groove, two belt clamping members at opposite sides of said groove and hinged to said back stops to swing downwardly toward said base and upwardly and rearwardly therefrom, one of said clamping members having a diagonal edge unidirectional with and adjacent said groove, the other of said clamping members being relatively long and narrow and being spaced longitudinally of the base from said groove, means for holding at least one of said clamping members in lowered position, and a knife guide removably seated in said groove.

9. A belt splicing device comprising a belt supporting base having a transverse diagonal groove between its ends, the rear longitudinal edge of said base being provided with upwardly projecting back stops at opposite sides of said groove, two belt clamping members at opposite sides of said groove and hinged to said back stops to swing downwardly toward said base and upwardly and rearwardly therefrom, one of said clamping members having a diagonal edge unidirectional with and adjacent said groove, the other of said clamping members being relatively long and narrow and being spaced longitudinally of the base from said groove, means for holding at least one of said clamping members in lowered position, a lower belt end clamping member removably seated in said groove and substantially flush with the upper side of said base, an upper belt end clamping member to lie upon cemented together belt ends resting upon said lower belt end clamping member, and means for connecting said upper and lower belt end clamping members with each other.

WILLIAM D. DAIN.

REFERENCES CITED

The following references are of record in the file of this patent:

UNITED STATES PATENTS

| Number | Name | Date |
|---|---|---|
| 1,007,034 | Kline | Oct. 24, 1911 |
| 1,083,590 | Burley | Jan. 6, 1914 |
| 1,488,866 | Clark | Apr. 1, 1924 |
| 1,596,966 | Griswold | Apr. 24, 1926 |
| 1,781,200 | Spiros | Nov. 11, 1930 |
| 1,999,856 | Austin | Apr. 30, 1935 |
| 2,487,149 | Leguillon | Nov. 8, 1949 |

FOREIGN PATENTS

| Number | Country | Date |
|---|---|---|
| 155,671 | Austria | Sept. 24, 1937 |